(12) United States Patent
Uesaka et al.

(10) Patent No.: US 7,064,798 B2
(45) Date of Patent: Jun. 20, 2006

(54) TRANSLUCENT REFLECTIVE LIQUID CRYSTAL DISPLAY

(75) Inventors: Tetsuya Uesaka, Yokohama (JP); Eiji Yoda, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 68 days.

(21) Appl. No.: 10/474,526

(22) PCT Filed: Mar. 19, 2002

(86) PCT No.: PCT/JP02/02575

§ 371 (c)(1),
(2), (4) Date: Oct. 9, 2003

(87) PCT Pub. No.: WO02/084389

PCT Pub. Date: Oct. 24, 2002

(65) Prior Publication Data

US 2004/0119920 A1    Jun. 24, 2004

(30) Foreign Application Priority Data

Apr. 13, 2001   (JP) .............................. 2001-115704

(51) Int. Cl.
G02F 1/1335   (2006.01)
G02F 1/13363  (2006.01)
G02F 1/139    (2006.01)

(52) U.S. Cl. ........................ 349/114; 349/119; 349/121

(58) Field of Classification Search ................ 349/113, 349/117, 119, 121, 127, 177, 183, 96, 98, 349/114, 132, 136, 193; 428/1.1, 1.3, 1.31
See application file for complete search history.

(56) References Cited

U.S. PATENT DOCUMENTS

2003/0164921 A1 * 9/2003 Uesaka et al. .............. 349/194

FOREIGN PATENT DOCUMENTS

| EP | 0982621 | | 3/2000 |
| JP | 00187220 | | 7/2000 |
| WO | WO 02/06863 | * | 1/2002 |

* cited by examiner

Primary Examiner—Toan Ton
Assistant Examiner—Tai Duong
(74) Attorney, Agent, or Firm—Adams & Wilks

(57) ABSTRACT

A transflective liquid crystal display has a first substrate having a transparent electrode, a second substrate having a transflective electrode, a liquid crystal layer disposed between the first and second substrates, a first optical anisotropic element arranged on the first substrate, and a second optical anisotropic element arranged on the second substrate and having a liquid crystal film. An angle within the range of 0 to 30 degrees is formed by a tilt direction defined by a projection direction of a director of a liquid crystalline polymer molecule on a surface of the liquid crystal film to which an angle of the director of the liquid crystalline polymer molecule is smaller and a pre-tilt direction defined by a projection direction of a director of a liquid crystalline molecule on an interface between liquid crystal of the liquid crystal layer and a surface of the first substrate.

12 Claims, 11 Drawing Sheets

TRANSLUCENT REFLECTIVE LIQUID CRYSTAL DISPLAY

BACKGROUND OF THE INVENTION

1. Field of the Invention

The present invention relates to a liquid crystal display provided with both reflection and transmission functions which display is used in various office automation (OA) equipment such as a word processor and a personal computer, mobile information terminals such as a mobile telephone device and a PDA (Personal Digital Assistant), or camcorders equipped with a liquid crystal monitor.

2. Background Information

In recent years, a liquid crystal display has been increasingly expected to expand its market to that of a display for portable information terminal devices where the liquid crystal display can make the best use of its peculiar characteristics, i.e., thin in size and light in weight.

Since a mobile information terminal is generally battery-driven, it is important to reduce its electricity consumption. Therefore, attention has been given particularly on reflection type liquid crystal displays which are free of or need not use all the time an electricity-consuming back light and which can achieve reductions in electricity consumption, thickness, and weight.

Displaying modes used in a reflection type liquid crystal display are those widely used in a transmission type such as TN (twisted nematic) and STN (super twisted nematic) modes. However, even liquid crystal displays of TN and STN modes do not have sufficient display qualities as currently demanded in terms of luminance and contrast and are required to be improved in display qualities such as high luminance and improved contrast. The reflection type liquid crystal display has a drawback that it is extremely deteriorated in visibility when it is used in a dark place, resulting in the decrease in the reflection light to be used for displaying. On the other hand, contrary to this, the transmission type liquid crystal display has a problem that it is deteriorated in visibility when used under bright circumstances such as fine weather.

Therefore, a transflective liquid crystal display has been developed which combines a transmission display mode and a reflection display mode. However, it has a problem that light leakage occurs in a black display state, resulting in insufficient black level.

The transflective liquid crystal display requires light to be incident on the liquid crystal layer through a region with a transmission function in the transmission mode. Therefore, it is necessary to dispose a polarizer and one or more polymeric stretched films, typically polycarbonates, between the liquid crystal layer and the back light. However, the liquid crystal display in the transmission mode can not essentially avoid problems regarding viewing angle where the refractive index anisotropy peculiar to the liquid crystal molecules changes the displaying color and reduces the displaying contrast, when viewing the display from an oblique direction, and it is essentially difficult for such a combination of polymeric stretched films and a polarizer to enlarge the viewing angle.

An object of the present invention is to provide a transflective liquid crystal display which is bright in the transmission mode, high in contrast, and less dependent on the viewing angle.

SUMMARY OF THE INVENTION

According to a first aspect of the present invention, there is provided a transflective liquid crystal display which comprises a first substrate having a transparent electrode, a second substrate having a transflective electrode on which a region having a reflection function is formed and a region having a transmission function is formed, a homogeneously oriented liquid crystal layer sandwiched between the first and second substrates, a first optical anisotropic element arranged on the surface of the first substrate opposite to the surface contacting the liquid crystal layer, a polarizer arranged on the first optical anisotropic element, a second optical anisotropic element arranged on the surface opposite to the surface of the second substrate contacting the liquid crystal layer, and a polarizer arranged on the lower surface of the second optical anisotropic element wherein the second optical anisotropic element comprises at least one sheet of liquid crystal film obtained by fixing a nematic hybrid orientation formed by a liquid crystalline polymer exhibiting an optically positive uniaxial property, in a liquid crystal state.

According to a second aspect of the present invention, there is provided the transflective liquid crystal display of the first aspect wherein the second optical anisotropic element comprises at least one sheet of liquid crystal film obtained by fixing a nematic hybrid orientation formed by a liquid crystalline polymer exhibiting an optically positive uniaxial property, in a liquid crystal state and at least one sheet of polymeric stretched film.

According to a third aspect of the present invention, there is provided the transflective liquid crystal display of the first or second aspect wherein an angle is within the range of 0 to 30 degrees which angle is formed by a tilt direction of the liquid crystal film defined by the projection direction of the director of the liquid crystalline polymer molecule on the upper or lower surface of the liquid crystal film to whichever an angle of the director of the liquid crystalline polymer is smaller and a pretilt direction defined by the projection direction of the director of the liquid crystalline molecule on the cell interface on the first substrate side.

According to a forth aspect of the present invention, there is provided the transflective liquid crystal display of either one of the first to third aspects wherein the liquid crystal layer has a smaller thickness at the region having a reflection function than at the region having a transmission function.

DETAILED DESCRIPTION OF THE PREFERRED EMBODIMENT

Figure 1:
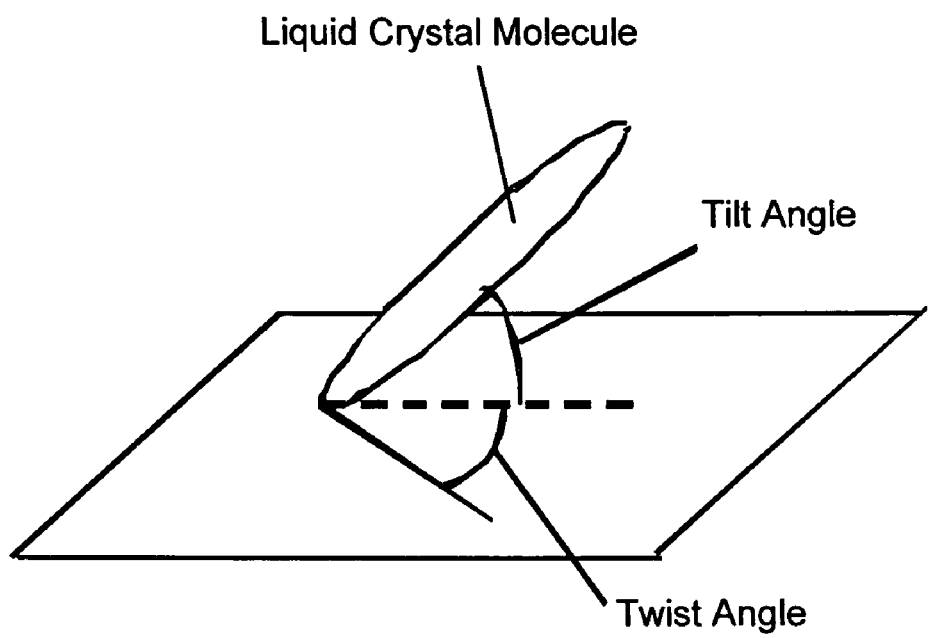
FIG. 1 is a conceptual view of describing the tilt angle and twist angle of a liquid crystalline molecule.

The present invention will be described in more detail below.

The "director" of the liquid crystalline polymer as referred to herein is a term used widely in the liquid crystal field and it is a vector indicating an average orientation direction of liquid crystal molecules in a certain microscopic region.

The transflective liquid crystal display of the present invention comprises a first substrate having a transparent electrode, a second substrate having a transflective electrode on which a region having a reflection function is formed and a region having a transmission function is formed, a homogeneously oriented liquid crystal layer sandwiched between the first and second substrates, a first optical anisotropic element arranged on the surface of the first substrate opposite to the surface contacting the liquid crystal layer, a polarizer arranged on the first optical anisotropic element, a second optical anisotropic element arranged on the surface opposite to the surface of the second substrate contacting the liquid crystal layer, and a polarizer arranged on the lower surface of the second optical anisotropic element wherein the second optical anisotropic element comprises at least one sheet of liquid crystal film obtained by fixing a nematic hybrid orientation formed by a liquid crystalline polymer exhibiting an optically positive uniaxial property, in a liquid crystal state The transflective liquid crystal display of the present invention is characterized in that the second optical anisotropic element comprises at least one sheet of liquid crystal film obtained by fixing a nematic hybrid orientation formed by a liquid crystalline polymer exhibiting an optically positive uniaxial property, in a liquid crystal state.

The transflective liquid crystal display of the present invention is constructed by a polarizer, a first optical anisotropic element, a first substrate having a transparent electrode, an oriented liquid crystal layer, a second substrate having a transflective electrode (hereinafter referred to as "reflection layer" if necessary) on which a region having a reflection function is formed and a region having a transmission function is formed, a second optically anisotropic element, a polarizer, and a back light, in the order as mentioned. If necessary, additional components such as a photo diffusing layer, a light-controlled film, a light guide plate, a prism sheet or the like may be provided. The transflective liquid crystal display of the present invention can be used both in a reflection mode and in a transmission mode by arranging a back light in the rear.

The next explanation is given to a liquid crystal cell constituted by the first substrate, the second substrate, and the homogeneously oriented liquid crystal layer sandwiched therebetween used in the present invention.

The liquid crystal cell contains the second substrate having a transflective electrode on which a region having a reflection function is formed and a region having a transmission function is formed. The region having a reflection function will be a reflection display part, while the region having a transmission function will be a transmission display part.

In the present invention, it is preferred that the liquid crystal layer has a smaller thickness at the region having a reflection function than at the region having a transmission function. The reason of this is set forth below.

First of all, described will be transmission displaying in the transmission display part in the case where a liquid crystal layer has a thickness suitable for reflection displaying. The degree of change in the state of polarized light involved with the change in the liquid crystal layer orientation by an external field such as an electric field in the case where the liquid crystal layer thickness is made to be suitable for reflection displaying is an extent that a light made incident from the observer side through the liquid crystal layer is reflected at the reflection layer and exits through the liquid crystal layer again to the observer side thereby obtaining a sufficient contrast ratio. However, in this case, the degree of change in the orientation state of a light passing through the liquid crystal layer is insufficient in the transmission display part. Therefore, even though in addition to a polarizer used for reflection displaying arranged on the observer's side of the liquid crystal cell, a polarizer only for transmission displaying is arranged on the rear side of the liquid crystal cell, sufficient displaying can not be obtained in the transmission display part. In other words, in the case where the orientation state of the liquid crystal layer is set to that suitable for the reflection display part, the transmission display part would lack luminance or would have a sufficient luminance but not be reduced in the transmittance upon a dark display, leading to a poor contrast ratio.

More specifically, upon reflection displaying, the liquid crystal orientation state in the liquid crystal layer is controlled by an applied voltage such that an optical retardation with about ¼ wavelength is imparted to a light passing through the liquid crystal layer only once. Transmission displaying effected with a liquid crystal layer with a thickness suitable for reflection displaying, i.e., by effecting a voltage modulation providing a phase modulation of a ¼ wavelength can not obtain a sufficiently bright display because the sufficient reduction of the transmittance when the transmittance display part is in a dark display mode causes the absorption of almost half of luminous intensity of light by the polarizer arranged on the side to which the light is reflected. Furthermore, when optical elements such as a polarizer and an optical retardation compensator are arranged so as to increase the luminosity upon a bright display mode of the transmission display part, the luminosity upon a dark display mode of the transmission display part will be about ½ of that upon the bright display mode, leading to a poor contrast ratio.

Contrary to this, in order to make the thickness of the liquid crystal layer'suitable for transmission displaying, a voltage modulation must be applied to the liquid crystal layer such that an optical retardation of a ½ wavelength is imparted to a light transmitting the liquid crystal layer. Therefore, in order to utilize both a reflected light and a transmitting light for a display mode with high resolution and excellent visibility, the liquid crystal layer of the reflection display part must be thicker than that of the transmission display part. In the present invention, the liquid crystal layer thickness of the reflection display part is preferably from 30 to 90 percent and particularly preferably from 40 to 60 percent, of that of the transmission display part. Ideally, the liquid crystal layer thickness of the reflection display part is about ½ of that of the transmission display part.

In the present invention, the mode of the liquid crystal cell is preferably a display mode utilizing an electrically controlled birefringence (ECB) in which liquid crystalline molecules are homogeneously oriented. The use of a TN or STN mode is not preferred because a problem from the viewpoint of production is susceptible to happen due to a defect in the liquid crystalline molecule orientation arising at the boundary between the transmission display part and the reflection display part when the difference in thickness therebetween becomes larger.

No particular limitation is imposed on the driving mode of the liquid crystal cell. Therefore, it may be a passive matrix mode used in an STN-LCD, an active matrix mode using active electrodes such as TFT (Thin Film Transistor) electrodes and TFD (Thin Film Diode) electrodes, and a plasma address mode.

The first substrate used in the present invention is a transparent substrate having a transparent electrode (counter electrode) while the second substrate is a transparent substrate having a transflective electrode.

No particular limitation is imposed on the transparent substrate forming the first or second substrate as long as it aligns a material exhibiting a liquid crystallinity forming the liquid crystal layer in a specific orientation direction. Specifically, there may be used either a transparent substrate having properties to align liquid crystal or a transparent substrate having no such properties but provided with an alignment film or the like having such properties. Electrodes for the cell may be conventional ones such as an ITO. Generally, the electrode can be provided on the surface contacting the liquid crystal layer, of the transparent substrate. In the case of using a transparent substrate having an alignment film, the electrode may be provided between the substrate and the alignment film.

No particular limitation is imposed on the liquid crystalline material forming the liquid crystal layer. Therefore, there may be used conventional various low molecular weight- and polymeric-liquid crystalline substances and mixtures thereof. The liquid crystalline material may be blended with a dye, a chiral dopant, and a non-liquid crystalline substance to an extent that the liquid crystallinity is not adversely affected.

No particular limitation is imposed on the material forming the reflection layer as long as it can reflect light. Therefore, the reflection layer material may be a metal such as aluminum, silver, gold, chromium, and platinum, an alloy containing one or more of these metals, an oxide such as magnesium oxide, a laminate of films of dielectrics, a liquid crystal film exhibiting a selective reflectivity, and combinations thereof. These reflection layers may be flat or curved and may be those provided with diffusive reflectivity by forming rugged patterns on its surface, those having a function as the electrode on the electrode substrate located on the side opposite to the viewing side, or any combination thereof.

No particular limitation is imposed on the polarizer as long as the objects of the present invention can be achieved. Therefore, there may be properly used conventional ones generally used in a liquid crystal display. Specific examples are PVA-based polarizing films such as polyvinyl alcohol (PVA) and partial acetal PVA, polarizing films such as those obtained by stretching a hydrophilic polymeric film comprising a partially saponified product of an ehtylene-vinyl acetate copolymer and absorbing iodine and/or dichroic dye, and those comprising a polyene-oriented film such as a dehydrated product of PVA and a dechlorinated product of polyvinyl chloride. Alternatively, there may be used reflection type polarizers.

These polarizers may be used independently or in combination with a transparent protective layer provided on one or both surfaces of the polarizer for the purpose of enhancing the strength, moisture resistance, and heat resistance. Examples of the protective layer are those formed by laminating a transparent plastic film such as polyester and triacetyl cellulose directly or via an adhesive layer on the polarizer; coated layers of resin; and acrylic- or epoxy-based photo-setting type resin layers. When the protective layers are coated on both surfaces of the polarizing film, they may be the same or different.

No particular limitation is imposed on the first optical retardation element used in the present invention as long as it has excellent transparency and uniformity. There may be preferably used polymeric stretched films and optical compensation films formed from a liquid crystal material.

Examples of the polymeric stretched films are uniaxial or biaxial optical retardation films formed with cellulose-, polycarbonate-, polyallylate-, polysulfone-, polyacryl, polyethersulfone-, or cyclic olefin-based polymers. Among these, polycarbonate-based polymers are preferred in terms of cost and film uniformity. Alternatively, a film with less birefringence chromatic dispersivity such as "ARTON" manufactured by JSR Corporation is also preferred because it can suppress the color modulation in the picture quality.

Examples of the optical compensation film formed from a liquid crystal material are those comprised of various liquid crystalline polymeric compounds exhibiting a main chain- and/or side chain-type liquid crystallinity such as liquid crystalline polyester, liquid crystalline polycarbonate, liquid crystalline polyacrylate, or liquid crystalline polymalonate or low molecular weight liquid crystalline substances having reactivities which can be polymerized by crosslinking or the like after being oriented. These films may be a single-layered film with self-supportiveness or formed over a transparent supporting substrate.

One or more of the first optical retardation elements may be used in the present invention. A polymeric stretched film and a liquid crystal optical compensation film may be used in combination.

The second optical anisotropic element used in the present invention comprises at least one sheet of liquid crystal film obtained by fixing a nematic hybrid orientation formed by a liquid crystalline polymer exhibiting an optically positive uniaxial property, in a liquid crystal state.

The second optical anisotropic element preferably comprises at least one sheet of liquid crystal film obtained by fixing a nematic hybrid orientation formed by a liquid crystalline polymer exhibiting an optically positive uniaxial property, in a liquid crystal state and at least one sheet of polymeric stretched film.

The second optical anisotropic element used in the present invention comprises a liquid crystalline polymer exhibiting an optically positive uniaxial property, more specifically a liquid crystalline polymeric compound exhibiting an optically positive uniaxial property or a liquid crystalline polymeric composition comprising at least one kind of liquid crystalline compound and exhibiting an optically positive uniaxial property and contains at least a liquid crystal film wherein a nematic hybrid orientation formed by the liquid crystalline polymeric compound or composition under a liquid crystal state is fixed.

The term "nematic hybrid orientation" used herein denotes an orientation structure wherein the liquid crystalline molecules are oriented in a nematic phase wherein the director of a liquid crystalline polymer to the upper and lower surfaces of the film form angles (tilt angles) different from each other in the respective surface. Therefore, since the angles formed by the director and the film planes are different between in the vicinities of the upper and lower interface of the film, the nematic hybrid orientation can be defined by an orientation wherein the tilt angle varies continuously between the upper and lower film surfaces.

In the present invention, the average tilt angle in the nematic hybrid orientation structure is preferably within the range of 5 to 45 degrees.

The liquid crystal film is one with a fixed nematic hybrid orientation structure in which the directors of the liquid crystalline molecules are directed at different angles in all the positions in the film thickness direction as described above. Therefore, there no longer exists any optical axis in the whole film structure.

The term "average tilt angle" used herein denotes the average value of the angles between the directors of the liquid crystalline molecules and a film plane along the liquid crystal film thickness direction. In the liquid crystal film, the absolute value of the angle formed by the directors of the liquid crystalline molecules in the vicinity of one film interface and the film surface is generally 20 to 90 degrees, preferably 30 to 70 degrees, while the absolute value of the angle in the vicinity of the opposing film interface is generally 0 to 20 degrees, preferably 0 to 10 degrees. The absolute value of the average tilt angle in the orientation structure is generally 5 to 45 degrees, preferably 7 to 40 degrees, more preferably 10 to 38 degrees, and most preferably 15 to 35 degrees. The average tilt angle, if deviating from the above range, would cause the decrease of contrast of the resulting liquid crystal display. The average tilt angle can be determined by applying a crystal rotation method.

The liquid crystal film forming the second optical anisotropic element may be formed of any liquid crystalline material as long as the film has a fixed nematic hybrid orientation structure and a specific average tilt angle. For example, the film may be one obtained by aligning a low molecular weight liquid crystalline substance in a liquid crystalline state so as to assume a nematic hybrid orientation and fixing the orientation structure by photo- or thermal-crosslinking or one obtained by aligning a polymeric liquid crystalline substance in a liquid crystalline state so as to assume a nematic hybrid orientation and fixing the orientation structure by cooling. The term "liquid crystal film" used herein may denotes one obtained by forming a low molecular weight or polymeric liquid crystalline substance into a film and thus the liquid crystal film itself may not have a liquid crystallinity.

The thickness of the liquid crystal film which can exhibit a suitable viewing angle improving effect for the transflective liquid crystal display can not be determined with certainty because it depends on the mode and various optical parameters of the liquid crystal display wherein the film is provided. However, the thickness is generally from 0.2 µm to 10 µm, preferably from 0.3 µm to 5 µm, and more preferably 0.5 µm to 2 µm. The thickness of less than 0.2 µm would possibly fail to obtain a compensation effect. The thickness of more than 10 µm would probably cause the resulting liquid crystal display to be colored undesirously.

A pseudo retardation value in the plane of a liquid crystal film plane when viewing the film from the normal direction is explained as follows. That is, in a liquid crystal film with a fixed nematic hybrid orientation structure, the refractive index ($n_e$) parallel to the directors is different from the refractive index ($n_o$) perpendicular to the directors. Therefore, the value obtained by subtracting $n_o$ from $n_e$ is defined as a pseudo birefringence, and the pseudo retardation value is determined by the product of the birefringence and the absolute film thickness. Generally, this pseudo retardation value is easily obtained by a polarization optical measurement such as ellipsometry. The pseudo retardation value of the liquid crystal film used as the optical anisotropic element is within the range of generally 10 nm to 600 nm, preferably 30 nm to 400 nm, and more preferably 50 nm to 300 nm with respect to a single color light of 550 nm. A retardation value of less than 10 nm would possibly fail to enlarge the viewing angle of the resulting liquid crystal display. A retardation value of more than 600 nm would cause unnecessary coloration in the resulting liquid crystal display when viewing the display obliquely.

Next, the arrangement conditions of the optical anisotropic elements in the transflective liquid crystal display of the present invention will be described in more detail. In order to describe the specific arrangement conditions, the upper and lower planes of the optical anisotropic element comprised of the liquid crystal film, the tilt direction of the element and the pretilt direction of the liquid crystal cell are defined using FIGS. 2 and 3 below, respectively.

First of all, when the upper and lower surfaces of the optical anisotropic element comprising the liquid crystal film are defined by the angles formed by the directors of the liquid crystalline molecules in the vicinity of the film interfaces and the film planes, the plane forming an angle of 20 to 90 degrees at the acute angle side with the director is defined as "b-plane" while the plane forming an angle of 0 to 20 degrees at the acute angle side is defined as "c-plane".

Figure 2:
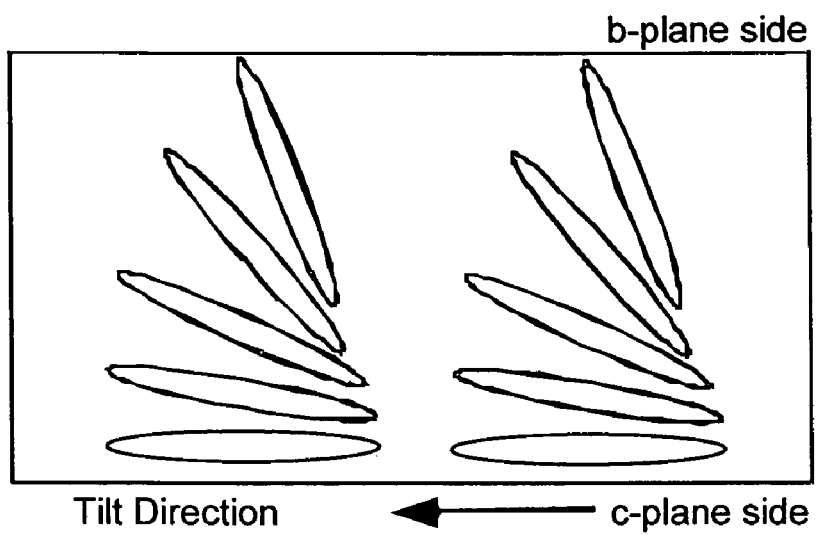
FIG. 2 is a conceptual view of the orientation structure of a liquid crystal film constituting the second optical anisotropic element.

The tilt direction of the optical anisotropic element is defined by a direction in which when viewing through the liquid crystal film from the b-plane side to the c-plane side, the director of a liquid crystalline molecule and the projection thereof on the c-plane forms an acute angle and which is parallel to the projection (FIGS. 1 and 2).

Figure 3:
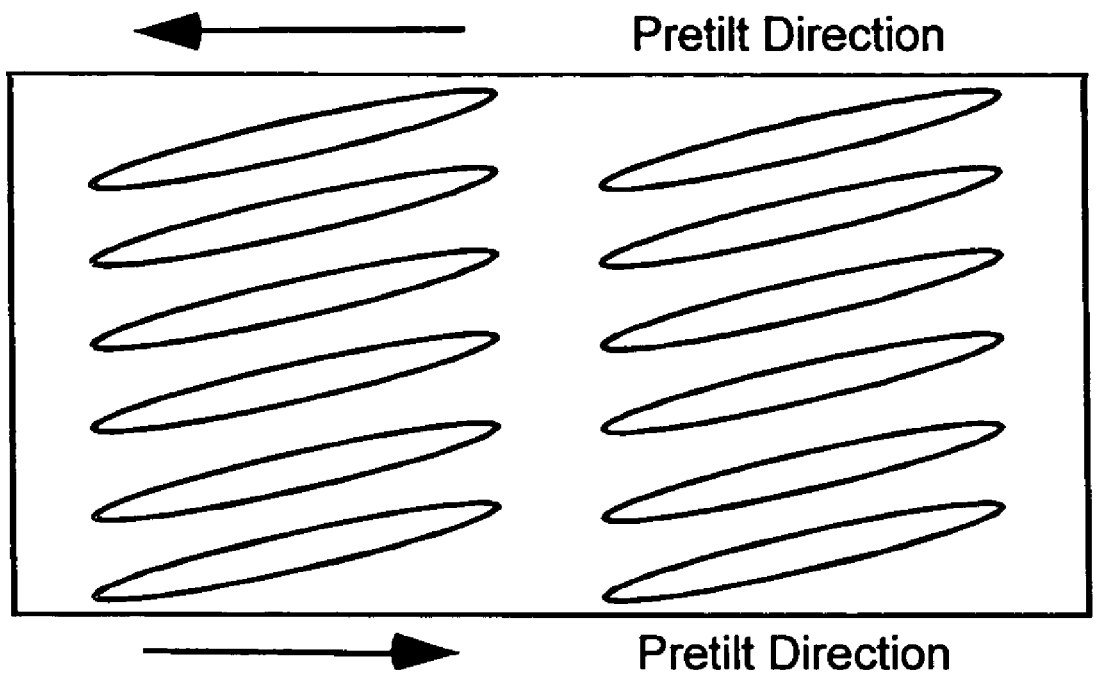
FIG. 3 is a conceptual view describing the pretilt direction of a liquid crystal cell.
Figure 4:
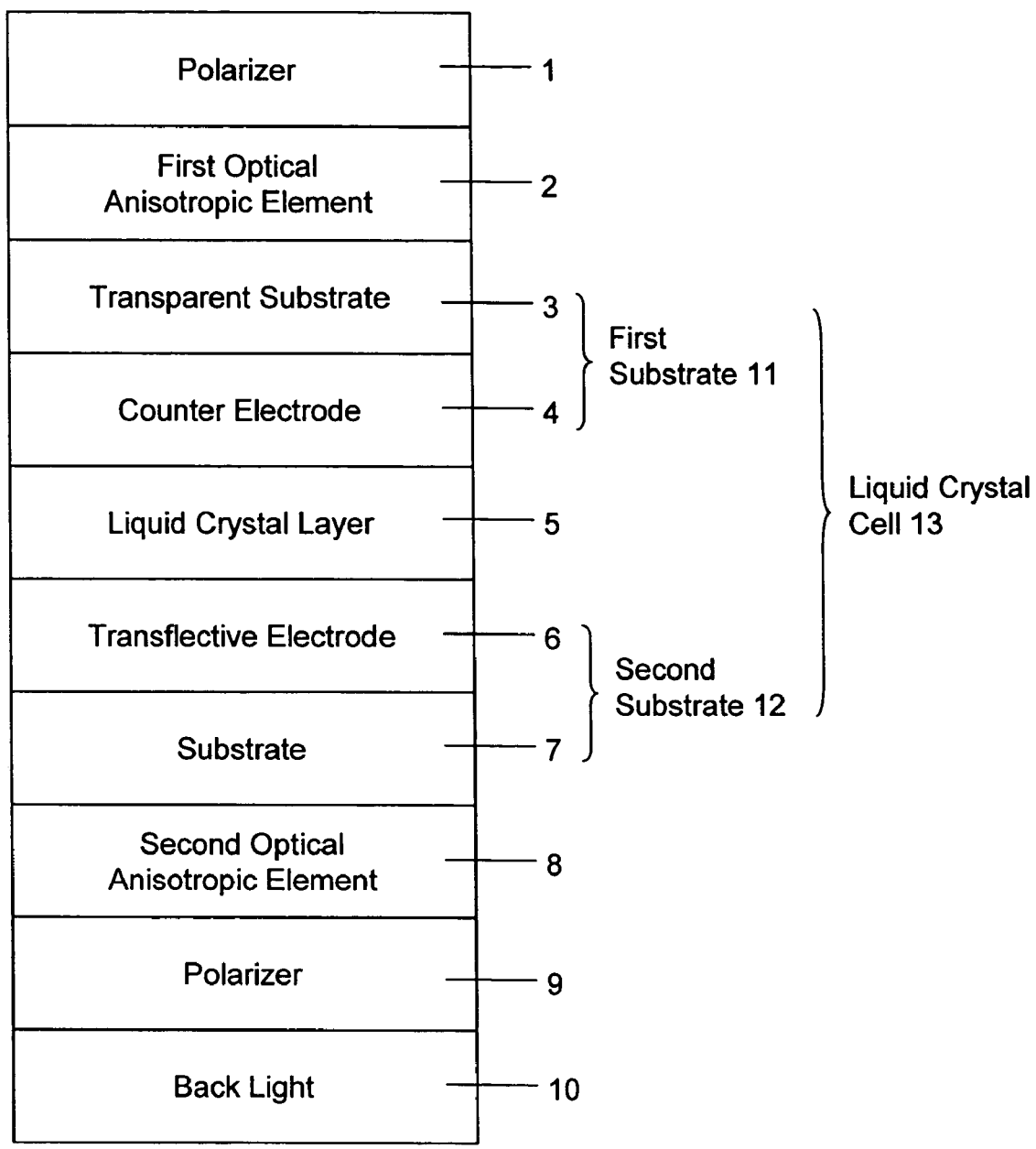
FIG. 4 is a schematic cross-sectional view of the transflective liquid crystal display of the present invention.

Generally, on the interface between the liquid crystal in the liquid crystal cell and each of the substrate, i.e., the cell interface, a driving low molecular weight liquid crystal is not parallel to the cell interface and tilted at a certain angle which is generally referred to as "pre-tilt angle". However, a direction along which the director of a liquid crystalline molecule on the cell interface and the projection thereof form an acute angle and which is parallel to the projection is defined as "pre-tilt direction of the liquid crystal cell" (FIG. 3).

The second optical anisotropic element may be comprised of the above-described liquid crystal film and a polymeric stretched film.

Examples of such a polymeric stretched film are mediums exhibiting uni- or bi-axial properties which may be various polymeric stretched films such as polycarbonate (PC), polymethacrylate (PMMA), polyvinyl alcohol (PVA), and "ARTON" manufactured by JSR Corporation. The combination of a single liquid crystal film and a single polymeric stretched film is practically preferred in view of the production cost.

The liquid crystal film of the second anisotropic element may be used as a single unit or in combination with a supporting substrate such as a transparent plastic film. Alternatively, the liquid crystal film may be used integrally with a polarizer. In the case of using the liquid crystal film as a single unit, it is usually used after being laminated over a transparent plastic film used for protecting a polarizer, such as polyester and triacetylcellulose. Alternatively, if necessary, the liquid crystal film and/or a polymeric stretched film may be integrated with a polarizer via a pressure-sensitive adhesive or an adhesive.

When only a single liquid crystal film is used as the second anisotropic element of the transflective liquid crystal display, the film is preferably arranged between the second substrate of the liquid crystal cell and the polarizer. It is also preferred that the tilt direction of the liquid crystal film is roughly coincide with the pretilt direction of the liquid crystalline molecule of the liquid crystal layer on the liquid crystal interface facing the first substrate. The absolute value of the angle formed by the tilt direction and the pretilt direction is within the range of preferably 0 to 30 degrees, more preferably 0 to 20 degrees, and particularly preferably 0 to 10 degrees. The angle in excess of 30 degrees would result in a poor viewing angle compensation effect.

When the combination of a single liquid crystal film and a single polymeric stretched film is used as the second optical anisotropic element for the transflective liquid crystal display, they are arranged between the second substrate and the polarizer. In this case, the liquid crystal film may be arranged on the side adjacent to the liquid crystal cell or the side adjacent to the polarizer.

In the present invention, when the liquid crystal film and a polymeric stretched film are arranged, the liquid crystal film is preferably arranged similarly to the case where only a single liquid crystal film is used. That is, it is preferred that the tilt direction of the liquid crystalline polymer in the liquid crystal film is roughly coincide with the pretilt direction of the liquid crystalline molecule of the liquid crystal layer on the liquid crystal interface facing the first substrate. The angle formed by the tilt direction and the pretilt direction is within the range of preferably 0 to 30 degrees, more preferably 0 to 20 degrees, and particularly preferably 0 to 10 degrees. The polymeric stretched film is arranged such that the tilt direction of the liquid crystal film and the retardation axis of the polymeric stretched film form an angle within the range of preferably 40 to 80 degrees and more preferably 50 to 70 degrees.

No particular limitation is imposed on the photo-diffusive layer, back light, the light-controlled film, the light guide plate, and the prism sheet. Therefore, conventional ones may be used.

In addition to the above-described components, the transflective liquid crystal display of the present invention may be provided with another additional components. For example, the use of a color filter makes it possible to produce a color liquid crystal display which can provide multi- or full-colored images with increased color purity.

As described above, the transflective liquid crystal display of the present invention can provide a bright image of high contrast in the transmission mode and excellent viewing angle properties.

EXAMPLES

The present invention will be further described with reference to the following inventive and comparative examples but is not limited thereto. The retardations (Δ nd) in the examples are values at a wavelength of 550 nm, unless stated otherwise.

Example 1

Figure 5A:
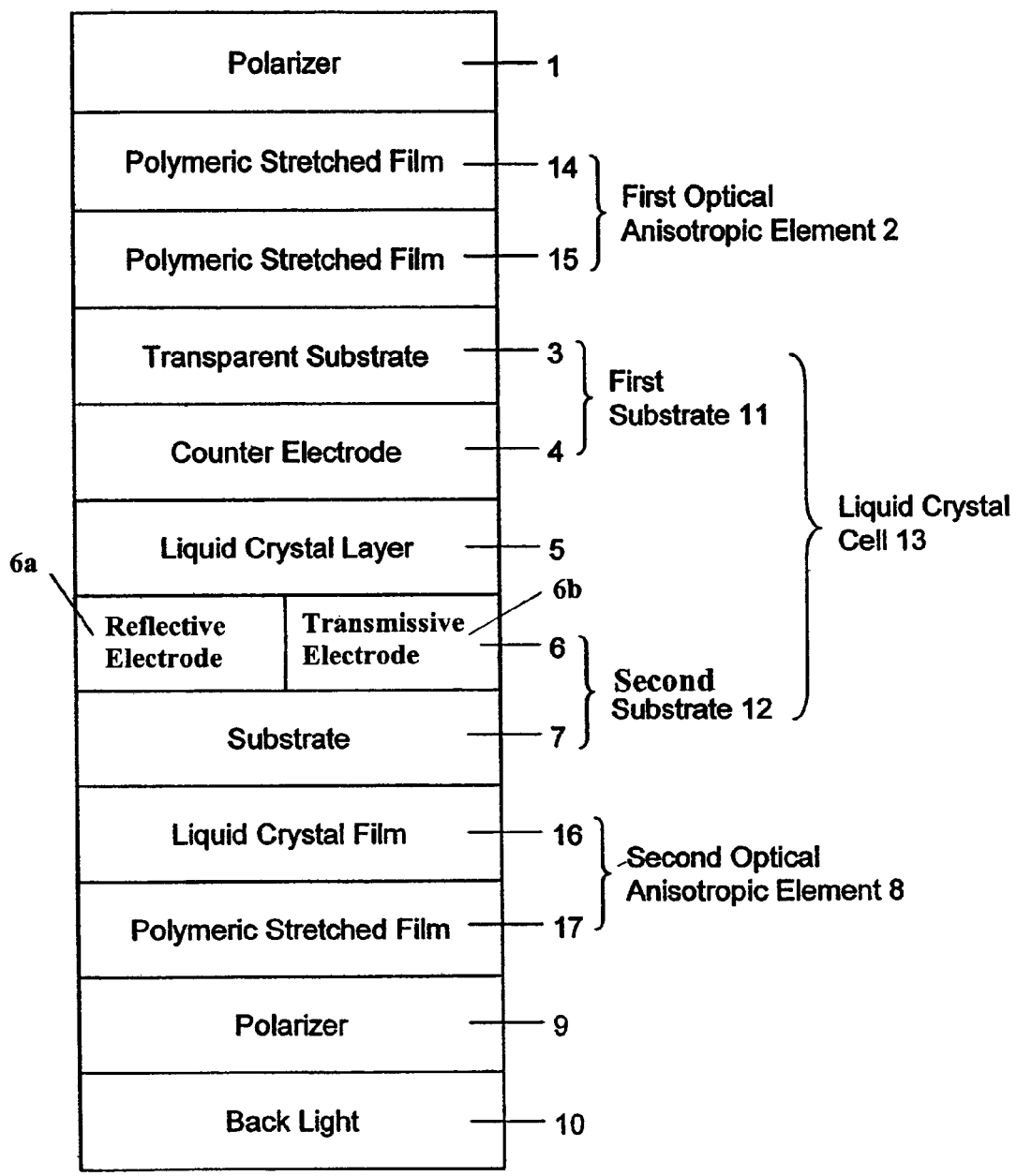
FIG. 5A shows schematically the transflective liquid crystal display used in Example 1.

FIG. 5A shows schematically the transflective liquid crystal display used in Example 1.

On the substrate 7 was disposed the transflective electrode 6 formed with a first region having a reflective electrode 6a of a highly reflective material such as A1 and having a reflection function, and a second region having a transmissive electrode 6b of a highly transmissive material such as ITO, while on the transparent substrate 3 was disposed the counter (transparent) electrode 4. The liquid crystal layer 5 formed of a liquid crystalline material exhibiting a liquid crystalline material exhibiting a positive dielectric constant anisotropy was sandwiched between the transflective electrode 6 and the counter electrode 4. Furthermore, in this display, the first optical anisotropic element 2 and a polarizer 1 are arranged on the surface opposite to the counter electrode of the transparent substrate 3 and the second optical anisotropic element 8 and the polarizer 9 are arranged on the surface opposite to the transflective electrode 6 and the substrate 7. The back light 10 is also provided on the rear side of the polarizer 9.

In accordance with the method described in Japanese Patent Laid-Open Publication No. 6-347742, a liquid crystal film 16 with a thickness of 0.68 μm was produced in which film a nematic hybrid orientation wherein the average tilt angle in the thickness direction was 28 degrees is fixed, thereby producing an ECB-type transflective liquid crystal display with the components arrangement shown in FIG. 5.

Figure 5B:
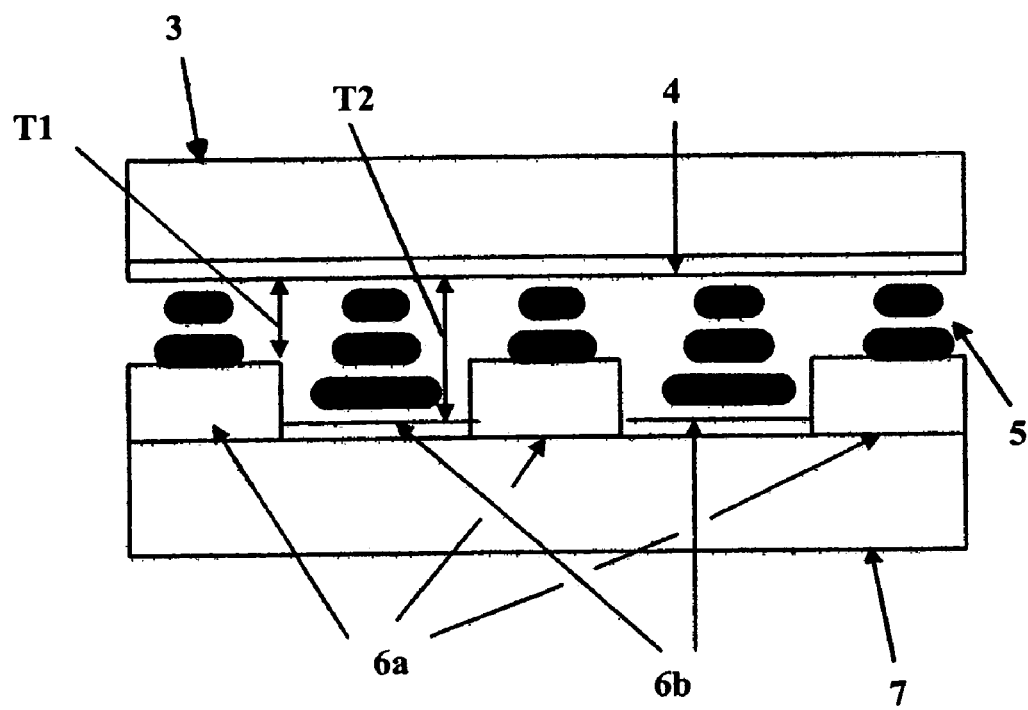
FIG. 5B is an enlarged schematic view showing the liquid crystal cell used in Example 1.

The liquid crystal cell 13 used herein contained ZLI-1695 manufactured by Merck Ltd. as a liquid crystalline material. As shown in FIG. 5B, the resulting liquid crystal layer 5 had the first or reflective electrode region (reflection display part) with a thickness T1 of 2.4 μm and the second or transmissive electrode region (transmission display part) with a thickness T2 of 4.8 μm. Stated otherwise, the liquid crystal layer 5 had a smaller thickness at the first region of the transflective electrode 6 than at the second region thereof. The pretilt angles of the liquid crystal layer on the both interfaces of the substrates were 2 degrees, respectively, the Δ nd of the liquid crystal cell was approximately 150 nm and 300 nm in the reflection display part and the transmission display part, respectively.

The polarizer 1 with a thickness of 180 μm (SQW-862 manufactured by Sumitomo Chemical Industry Co., Ltd.) was arranged on the viewing side (upper portion in the drawing) of the liquid crystal cell 13, and therebetween was arranged the first optical anisotropic element 2 constituted by polymeric stretched films 14 and 15 each formed by a uniaxially stretched polycarbonate film. The Δ nd of the polymeric stretched film 14 was approximately 268 nm, while the Δ nd of the polymeric stretched film 15 was approximately 98 nm.

The second anisotropic element 8 constituted by the liquid crystal film 16 and the polymeric stretched film 17 formed by a uniaxially stretched polycarbonate film was arranged behind the viewer's side of the liquid crystal cell 13 and the polarizer 9 was arranged behind the viewer's side of the film 17. The liquid crystal film 16 with a fixed hybrid nematic orientation structure had a $\Delta$ nd of 120 nm, while the polymeric stretched film 17 has a $\Delta$ nd of 272 nm.

Figure 6:
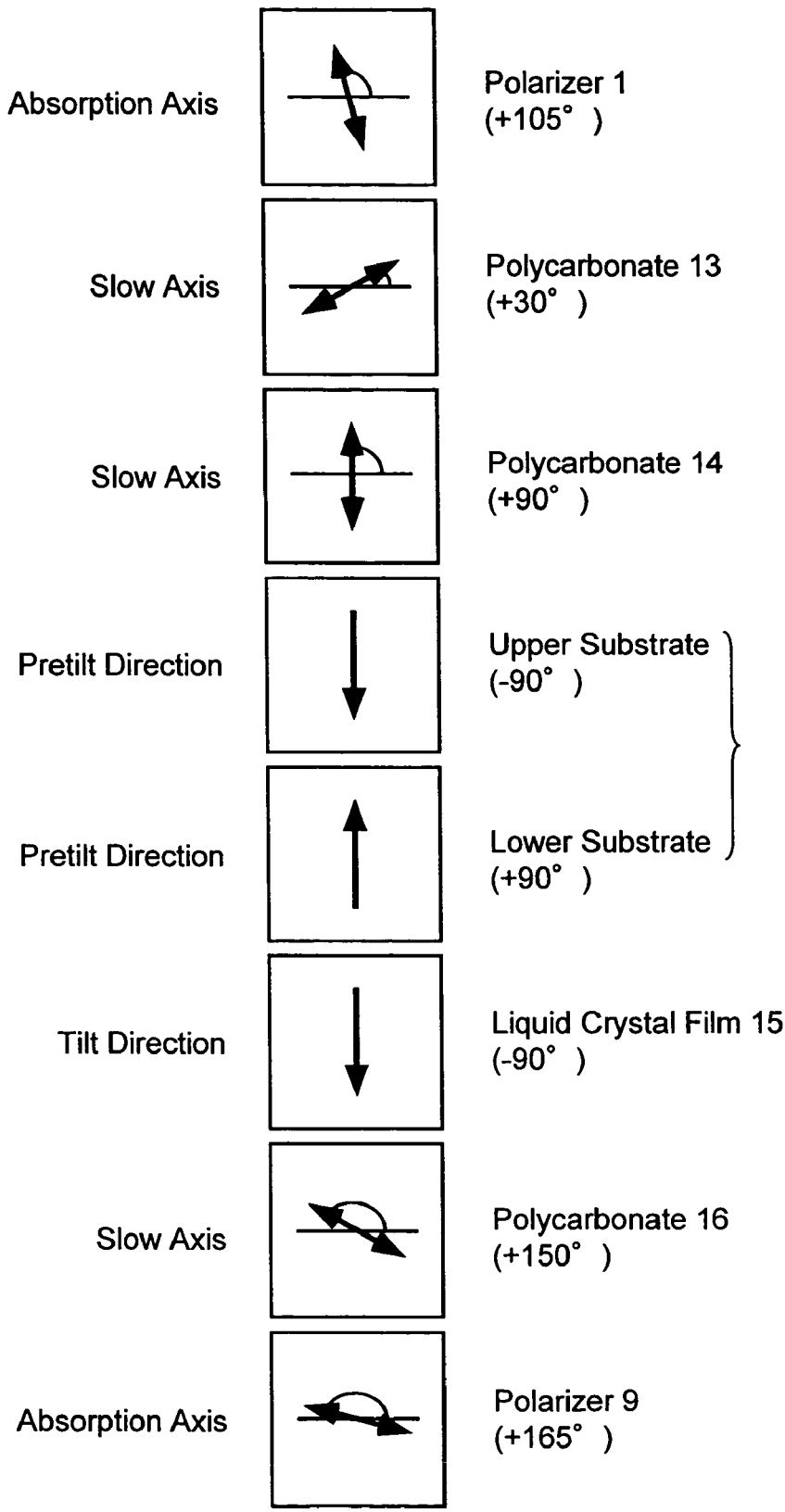
FIG. 6 is a plan view indicating the angular relations of the absorption axis of the polarizer, the pretilt directions of the liquid crystal cell, and the slow axes of the polymeric stretched films, and the tilt direction of the liquid crystal film in Example 1.

The absorption axes of the polarizers 1 and 9, the slow axes of the polymeric stretched films 14, 15, and 17, the pretilt angles of the liquid crystal cell 13 on the both interfaces, and the tilt direction of the liquid crystal film 16 were directed as shown in FIG. 6.

Figure 7:
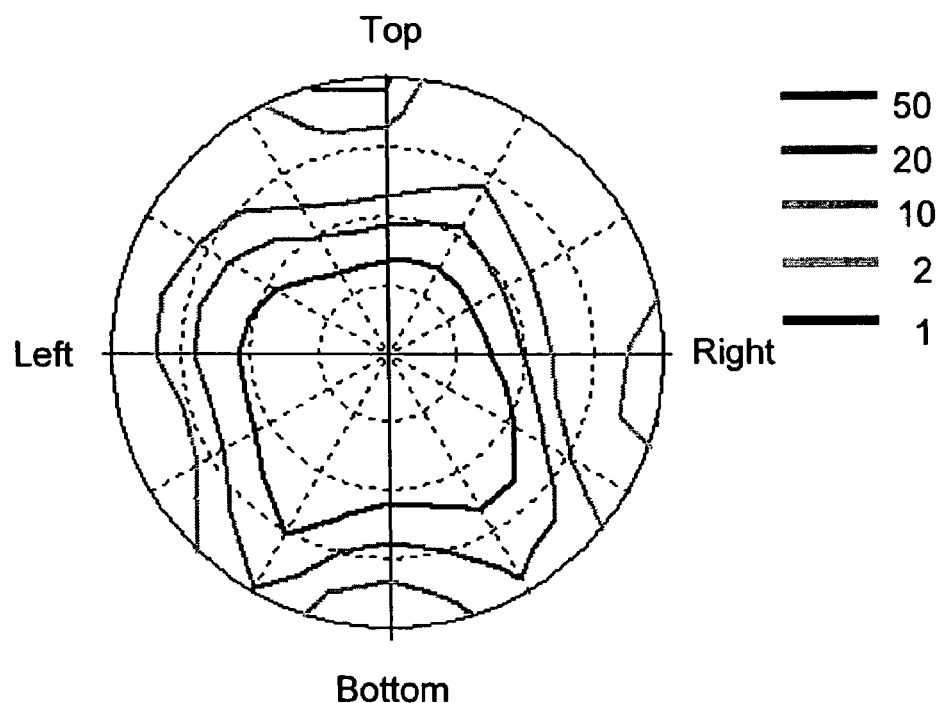
FIG. 7 is a view indicating the contrast ratio when viewing the transflective liquid crystal display of Example 1 from all the directions.

FIG. 7 shows the transmittance ratio (white image 0V)/(black image 6V) as the contrast ratio from all the directions when the back light is on (transmission mode).

Figure 8:
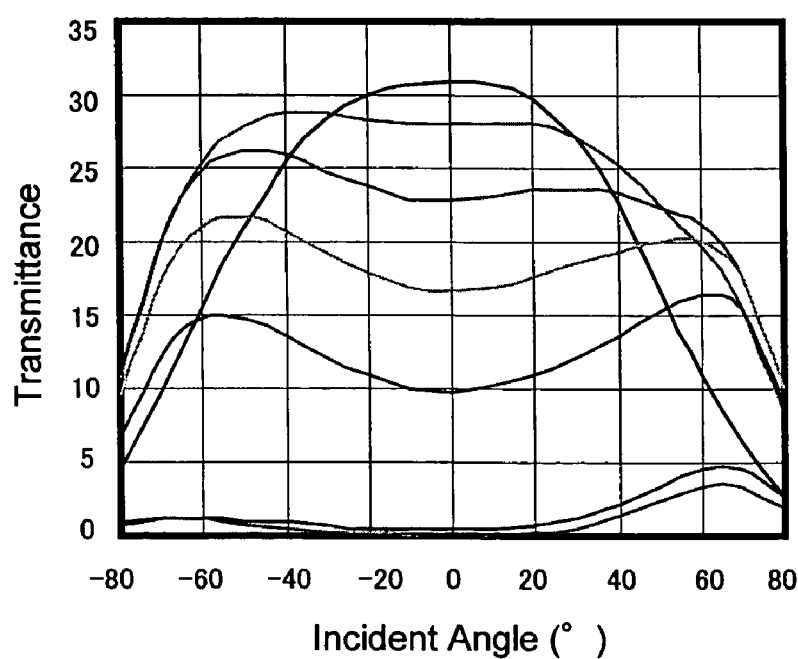
FIG. 8 shows the viewing angle properties of left and right direction transmittance of displayed images of six gradations from 0V to 6V of the transflective liquid crystal display of Example 1.

FIG. 8 shows the viewing angle properties of transmittance of displayed images of six gradations from a white image of 0V to a black image of 6V, in the left and right directions when the back light is on (transmission mode).

Figure 9:
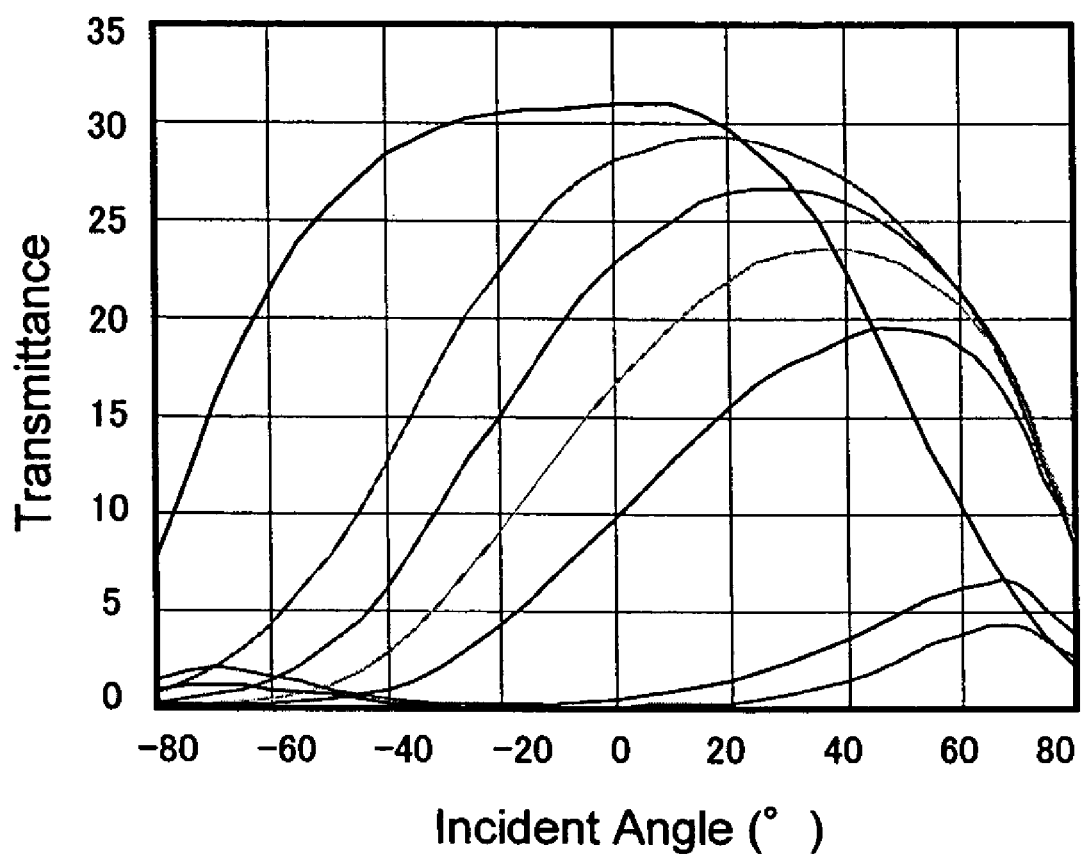
FIG. 9 shows the viewing angle properties of upper and lower direction transmittance of displayed image of six gradations from 0V to 6V of the transflective liquid crystal display of Example 1.

FIG. 9 shows the viewing angle properties of transmittance of displayed images of six gradations from a white image of 0V to a black image of 6V, in the upper and lower directions when the back light is on (transmission mode).

From the results shown in FIGS. 7 to 9, it was found that the liquid crystal display had excellent viewing angle properties particularly in the transmission mode.

Comparative Example 1

Figure 10:
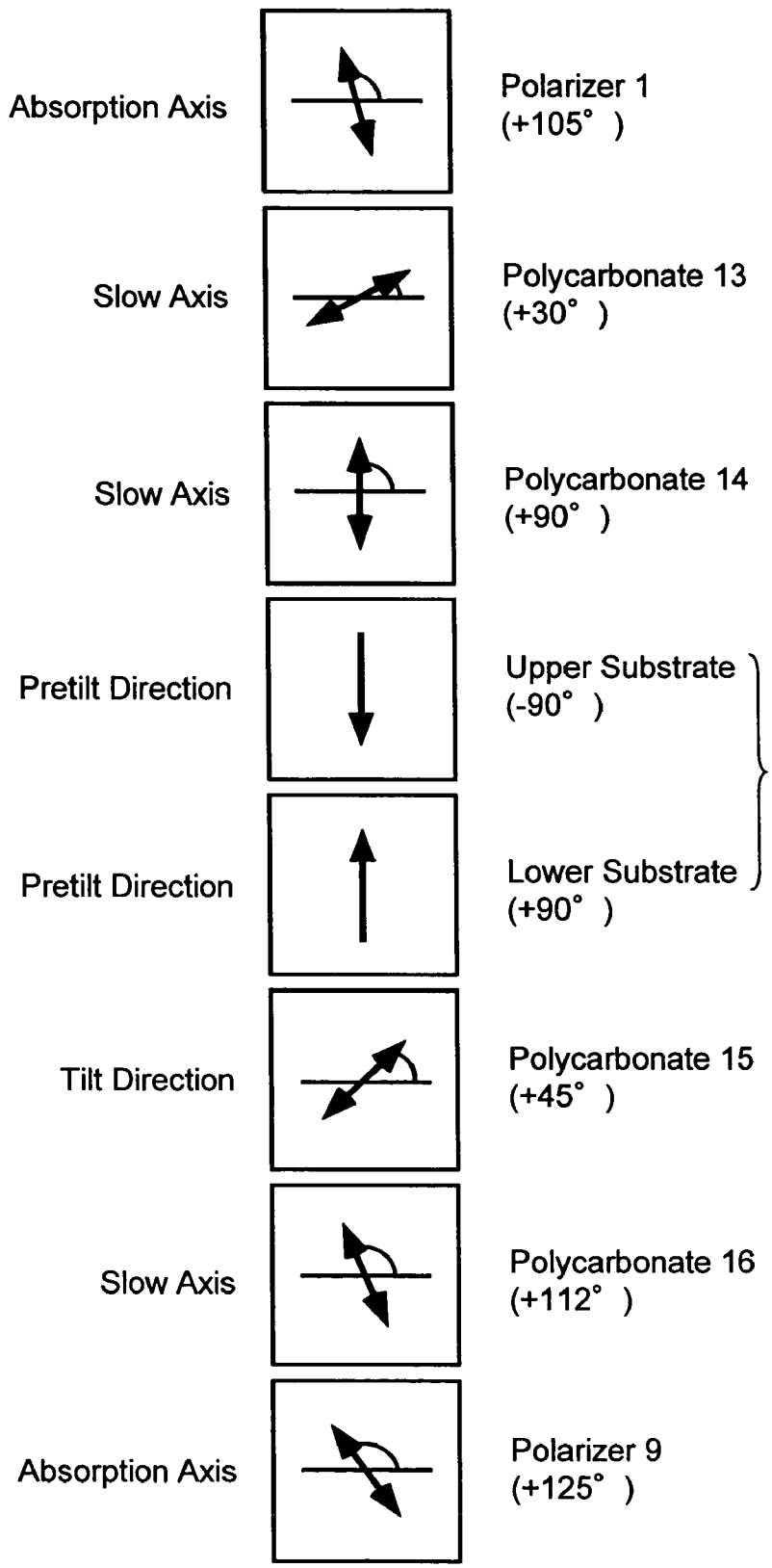
FIG. 10 is a elan view indicating the angular relations of the absorption axis of the polarizer, the pretilt directions of the liquid crystal cell, and the slow axes of the polymeric stretched films, in Comparative Example 1.

A liquid crystal display similar to that of Example 1 was produced except that in the structure shown in FIG. 5, a uniaxially stretched polycarbonate film 16' with a $\Delta$ nd of approximately 137 nm was arranged instead of the liquid crystal film 16 and the absorption axis of the polarizer arranged behind the viewer's side of the liquid crystal cell 13 and the slow axes of the polymeric stretched films 16' and 17 were directed as shown in FIG. 10.

Figure 11:
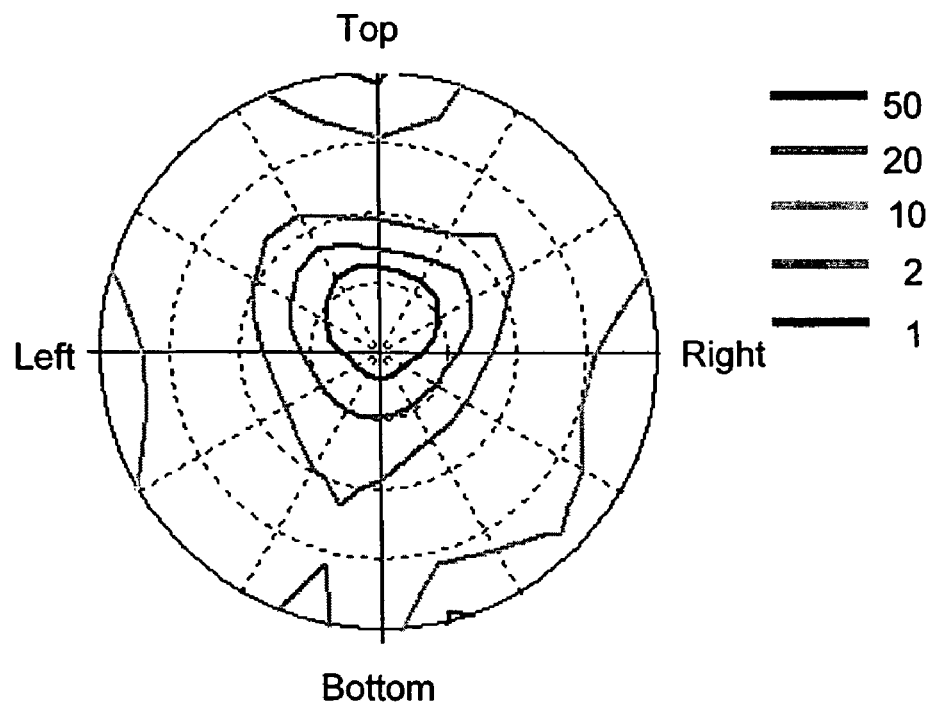
FIG. 11 is a view indicating the contrast when viewing the transflective liquid crystal display of Comparative Example 1 from all the directions.

FIG. 11 shows the transmittance ratio (white image 0V)/(black image 6V) as the contrast ratio from all the directions when the back light is on (transmission mode).

Figure 12:
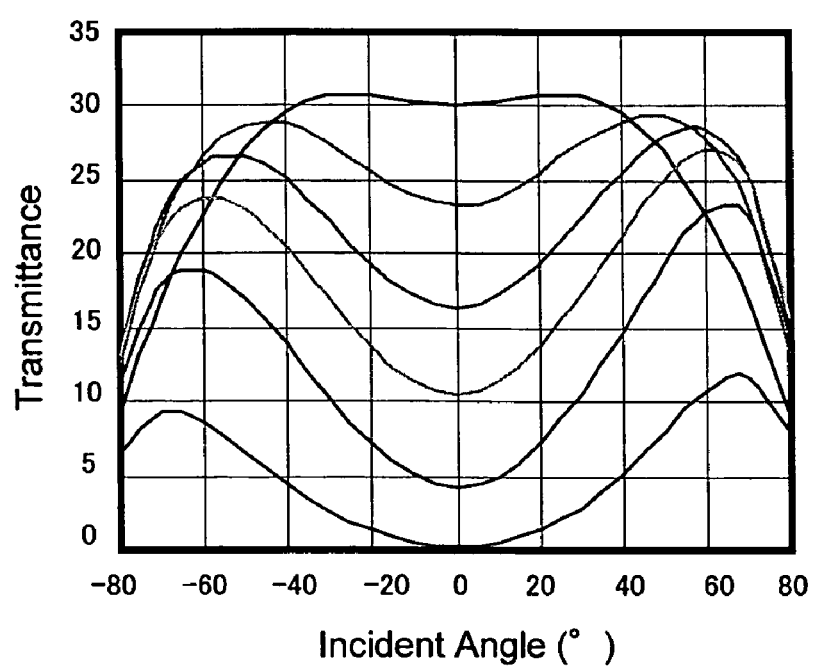
FIG. 12 shows the viewing angle properties of left and right direction transmittance of displayed images of six gradations from 0V to 6V of the transflective liquid crystal display of Comparative Example 1.

FIG. 12 shows the viewing angle properties of transmittance of displayed images of six gradations from a white image of 0V to a black image of 6V, in the left and right directions when the back light is on (transmission mode).

Figure 13:
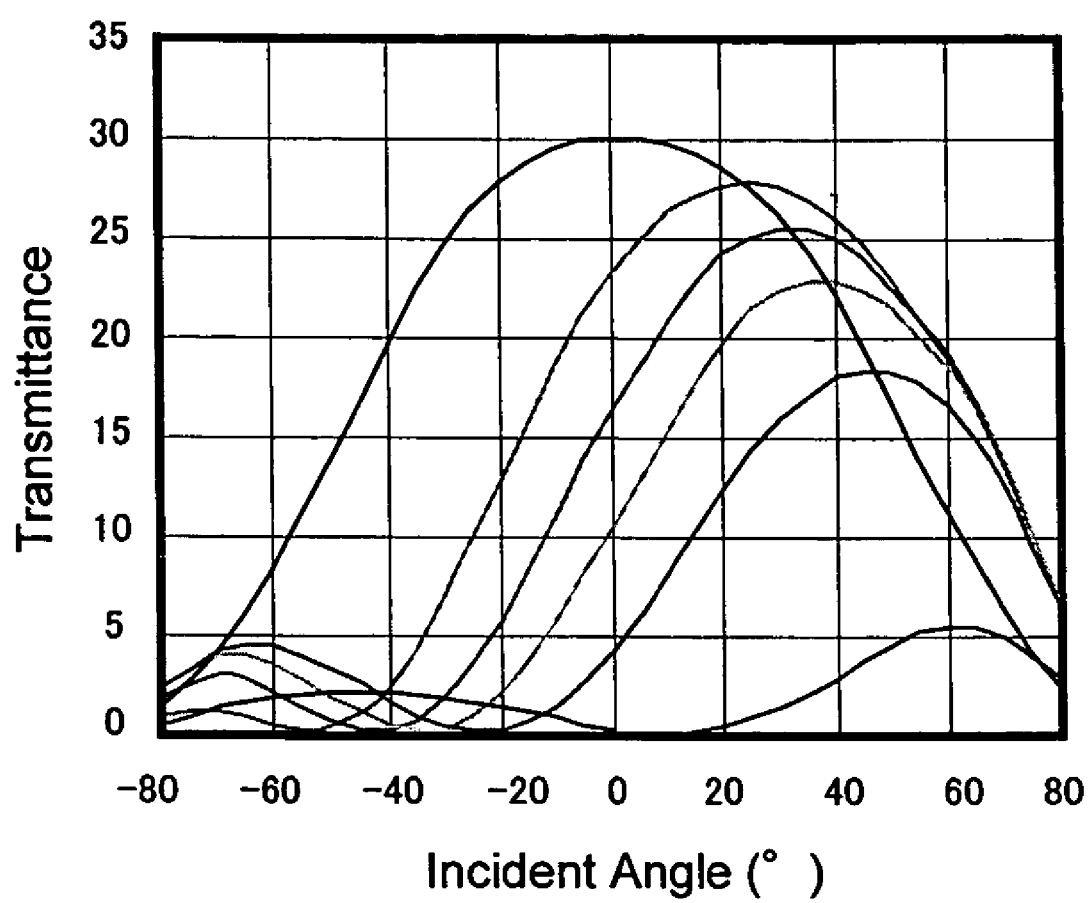
FIG. 13 shows the viewing angle properties of upper and lower direction transmittance of displayed images of six gradations from 0V to 6V of the transflective liquid crystal display of Comparative Example 1.

FIG. 13 shows the viewing angle properties of transmittance of displayed images of six gradations from a white image of 0V to a black image of 6V, in the upper and lower directions when the back light is on (transmission mode).

Example 1 and Comparative Example 1 were compared in terms of viewing angle properties.

When the contrast contours in all the directions of FIGS. 7 and 11 are compared, it was confirmed that wider viewing angle properties can be obtained using a liquid crystal film with a nematic hybrid structure.

When the upper and lower and left and right direction gradation properties which used to be a drawback in the transmission mode of conventional displays are compared in FIGS. 8 and 9 and FIGS. 12 and 13, it was confirmed that the inversion properties are improved using the liquid crystal film with a nematic hybrid structure.

In this example, the experiments were conducted without using a color filter. However, it is understood that a liquid crystal display provided with a color filter in the liquid crystal cell can display excellent multi-color or full-color images.

The invention claimed is:

1. A transflective liquid crystal display comprising: a first substrate having a transparent electrode; a second substrate having a transflective electrode formed with a first region having a reflection function and a second region having a transmission function; a homogeneously oriented liquid crystal layer sandwiched between and contacting a surface of each of the first and second substrates; a first optical anisotropic element arranged on a surface of the first substrate opposite to the surface thereof contacting the liquid crystal layer; a polarizer arranged on the first optical anisotropic element; a second optical anisotropic element arranged on a surface of the second substrate opposite to the surface thereof contacting the liquid crystal layer, the second optical anisotropic element comprising at least one sheet of liquid crystal film obtained by fixing a nematic hybrid orientation formed by a liquid crystalline polymer exhibiting an optically positive uniaxial property in a liquid crystal state; and a polarizer arranged on the second optical anisotropic element; wherein an angle formed by a tilt direction of the liquid crystal film and a pre-tilt direction of a liquid crystalline molecule of the liquid crystal layer is within the range of 0 to 30 degrees, the tilt direction being defined by a projection direction of a director of a liquid crystalline polymer molecule on an upper or lower surface of the liquid crystal film to which an angle of the director of the liquid crystalline polymer molecule is smaller, and the pre-tilt direction being defined by a projection direction of a director of the liquid crystalline molecule on an interface between the liquid crystal of the liquid crystal layer and a side of the first substrate.

2. A transflective liquid crystal display according to claim 1; wherein the second optical anisotropic element further comprises at least one sheet of polymeric stretched film.

3. A transflective liquid crystal display according to claim 1; wherein the liquid crystal layer has a smaller thickness at the first region of the transflective electrode than at the second region of the transflective electrode.

4. A transflective liquid crystal display according to claim 2; wherein the liquid crystal layer has a smaller thickness at the first region of the transflective electrode than at the second region of the transflective electrode.

5. A transflective liquid crystal display comprising: a first substrate having a transparent electrode; a second substrate having a transflective electrode formed with a first region having a reflection function and a second region having a transmission function; a homogeneously oriented liquid crystal layer sandwiched between and contacting a surface of each of the first and second substrates; a first optical anisotropic element arranged on a surface of the first substrate opposite to the surface thereof contacting the liquid crystal layer; a polarizer arranged on the first optical anisotropic element; a second optical anisotropic element arranged on a surface of the second substrate opposite to the surface thereof contacting the liquid crystal layer, the second optical anisotropic element comprising at least one sheet of liquid crystal film obtained by fixing a nematic hybrid orientation formed by a liquid crystalline polymer exhibiting an optically positive uniaxial property in a liquid crystal state; and a polarizer arranged on the second optical anisotropic element; wherein an angle formed by a tilt direction of the liquid crystal film and a pre-tilt direction of a liquid crystalline molecule of the liquid crystal layer is within the range of 0 to 20 degrees, the tilt direction being defined by a projection direction of a director of a liquid crystalline polymer molecule on an upper or lower surface of the liquid crystal film to which an angle of the director of the liquid crystalline polymer molecule is smaller, and the pre-tilt direction being defined by a projection direction of a director of the liquid crystalline molecule on an interface between the liquid crystal of the liquid crystal layer and a side of the first substrate.

6. A transflective liquid crystal display according to claim 5; wherein the second optical anisotropic element further comprises at least one sheet of polymeric stretched film.

7. A transflective liquid crystal display according to claim 6; wherein the liquid crystal layer has a smaller thickness at the first region of the transflective electrode than at the second region of the transflective electrode.

8. A transflective liquid crystal display according to claim 5; wherein the liquid crystal layer has a smaller thickness at the first region of the transflective electrode than at the second region of the transflective electrode.

9. A transflective liquid crystal display comprising: a first substrate having a transparent electrode; a second substrate having a transflective electrode formed with a first region having a reflection function and a second region having a transmission function; a homogeneously oriented liquid crystal layer sandwiched between and contacting a surface of each of the first and second substrates; a first optical anisotropic element arranged on a surface of the first substrate opposite to the surface thereof contacting the liquid crystal layer; a polarizer arranged on the first optical anisotropic element; a second optical anisotropic element arranged on a surface of the second substrate opposite to the surface thereof contacting the liquid crystal layer, the second optical anisotropic element comprising at least one sheet of liquid crystal film obtained by fixing a nematic hybrid orientation formed by a liquid crystalline polymer exhibiting an optically positive uniaxial property in a liquid crystal state; and a polarizer arranged on the second optical anisotropic element; wherein an angle formed by a tilt direction of the liquid crystal film and a pre-tilt direction of a liquid crystalline molecule of the liquid crystal layer is within the range of 0 to 10 degrees, the tilt direction being defined by a projection direction of a director of a liquid crystalline polymer molecule on an upper or lower surface of the liquid crystal film to which an angle of the director of the liquid crystalline polymer molecule is smaller, and the pre-tilt direction being defined by a projection direction of a director of the liquid crystalline molecule on an interface between the liquid crystal of the liquid crystal layer and a side of the first substrate.

10. A transflective liquid crystal display according to claim 9; wherein the second optical anisotropic element further comprises at least one sheet of polymeric stretched film.

11. A transflective liquid crystal display according to claim 10; wherein the liquid crystal layer has a smaller thickness at the first region of the transflective electrode than at the second region of the transflective electrode.

12. A transflective liquid crystal display according to claim 9; wherein the liquid crystal layer has a smaller thickness at the first region of the transflective electrode than at the second region of the transflective electrode.

* * * * *